United States Patent [19]

Darjany et al.

[11] 4,146,174
[45] Mar. 27, 1979

[54] SELF CLOCKING MAGNETIC ENCODER

[75] Inventors: John C. Darjany, Long Beach; Gary W. Lorenz, Cerritos, both of Calif.

[73] Assignee: R. D. Products, Inc., Victor, N.Y.

[21] Appl. No.: 804,706

[22] Filed: Jun. 8, 1977

[51] Int. Cl.² .................... G06K 7/08; G06K 7/016; G11B 5/10; G11B 25/04

[52] U.S. Cl. .................... 235/449; 235/474; 360/129; 360/2; 235/482

[58] Field of Search .................... 360/2, 129, 130, 88, 360/51, 52, 2; 235/61.11 D, 61.12 M, 61.7 R, 61.7 B, 61.9 R, 61.11 R, 482, 449, 474; 340/149 A; 346/82

[56] References Cited

U.S. PATENT DOCUMENTS

| | | | |
|---|---|---|---|
| 3,419,710 | 12/1968 | Mathews | 235/61.11 D |
| 3,678,212 | 7/1972 | Wild | 360/130 |
| 3,836,753 | 9/1974 | Pass | 235/61.11 D |
| 3,893,182 | 7/1975 | Schmidt | 360/88 |
| 3,914,789 | 10/1975 | Coker | 360/2 |
| 3,997,917 | 12/1976 | Kihara | 360/88 |
| 4,002,887 | 1/1977 | Ouimette | 235/61.11 D |
| 4,017,857 | 4/1977 | Evans | 360/2 |

Primary Examiner—Robert M. Kilgore
Attorney, Agent, or Firm—George H. Lee; Foster York

[57] ABSTRACT

A magnetic information card encoding apparatus wherein the train of clock pulses used to synchronize the release of binary data from a storage register to a recorder head is generated by the motion of the card itself. Structural means forms a card receiving slot into which the card is manually inserted and removed. A rotatable carriage assembly consists of a drive shaft, photoelectric means responsive to rotation of the drive shaft for generating the clock pulse train, an idler wheel, and spring biasing means for urging the idler wheel against the drive shaft in a friction drive relationship. A second spring biasing means urges the carriage assembly to rotate such that the idler wheel frictionally engages the card so as to be driven thereby. A switch is actuated by the leading edge of the card to provide a signal defining the position of the card in the slot. The arrangement is such that the information card is erased on insertion and encoded on withdrawal.

13 Claims, 6 Drawing Figures

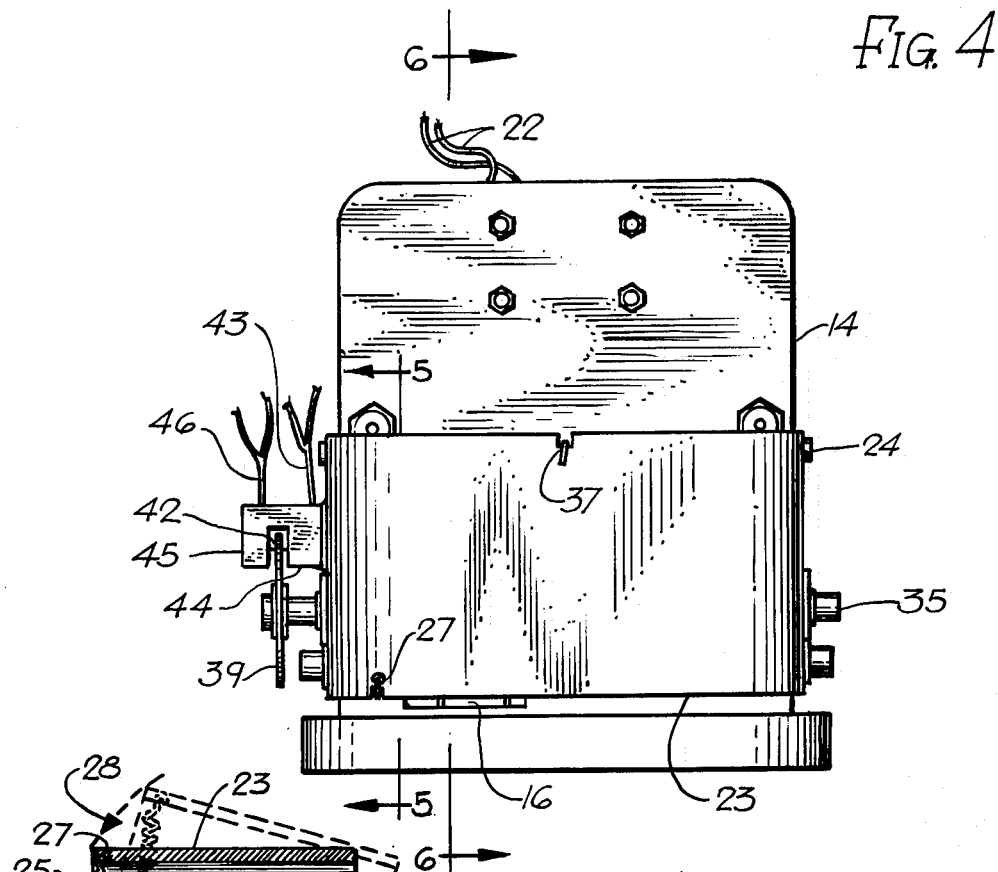
FIG. 4
FIG. 5
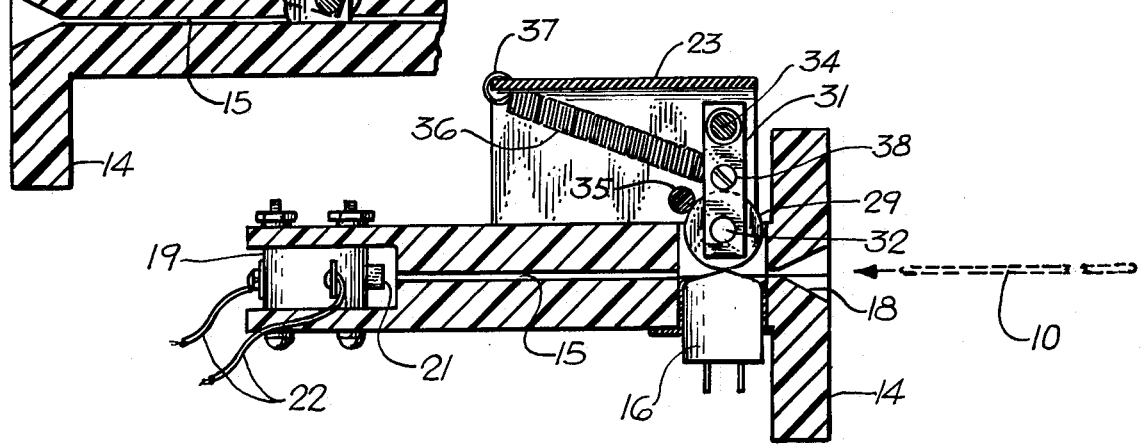
FIG. 6

SELF CLOCKING MAGNETIC ENCODER

BACKGROUND OF THE INVENTION

This invention relates to the magnetic information card art, and more particularly, to the encoding of such cards, that is, magnetically recording information thereon in binary data form for subsequent readout. Such cards are commonly referred to as mag-stripe cards because the information is normally recorded along one or more data tracks on a stripe of magnetic material running lengthwise of the card. A typical mag-stripe card is disclosed in U.S. Pat. No. 3,946,206 for Magnetic-Type Information Card and Method and Apparatus for Encoding and Reading, issued Mar. 23, 1976 in the name of John C. Darjany.

In the encoding of a card, it is, of course, necessary that the magnetic data be placed on the card in a predetermined desired position which takes into account the design of the readout equipment. In the most usual type of commercial operation, the card is encoded by the card manufacturer to the user's specification, and the manufacturer has sophisticated and highly accurate encoding equipment available to ensure that the magnetic data is properly positioned on the card. One example of encoding equipment which might be employed by a card manufacturer is disclosed in FIG. 13 of the above referred to Darjany U.S. Pat. No. 3,946,206. As there shown, the card is automatically moved past a recording head at a constant speed by a constant speed drive. A photoelectric cell detects exactly when the card is positioned with respect to the recording head at the desired "start recording" point and signals the control circuit to initiate the serial release to the recording head of binary data previously stored in a storage register. A constant frequency generator provides a clock pulse signal which regulates the rate of release of the data according to its fixed frequency. It is evident that with such a system the placement of a given amount of information on the card can be accurately controlled, the constant frequency of the clock circuit and the constant speed of the card drive system determining the spacing of the data bits on the card. For example, exactly 32 bits of data can be accurately positioned on a predetermined one inch length of the magnetic stripe.

A need exists, however, for a simpler encoding system especially adapted for use in the field, i.e. by the ultimate user, who may not have the above described specialized and expensive encoding equipment, or who may not have a need for its degree of accuracy. In particular, a need exists for relatively simple, inexpensive, and compact information card encoding equipment which avoids the need for both the constant frequency clock pulse generator and the constant speed drive of the encoding system of U.S. Pat. No. 3,946,206.

SUMMARY OF THE INVENTION

In the encoding system incorporating the present invention, the card is manually inserted into a slot formed in a molding and having dimensions such as to accommodate the card. As it is inserted, the magnetic stripe moves past a recording head to erase any data previously recorded on the card. At its innermost position in the slot, the leading edge of the card activates a switch to signal that the card is in its innermost position and to permit the release of the binary data stored in a register. As the card is withdrawn, the movement of the card causes an equivalent rotation of a resilient idler wheel frictionally engaging the card which, in turn, causes a proportional rotation of a drive shaft with which it is frictionally engaged. Rotation of the drive shaft generates a train of clock pulses corresponding in frequency to the speed of card withdrawal, for transmission to the storage register. The binary data is thus released from the storage register and applied to the recording head in synchronism with the clock pulses.

A unique mechanical design involving a dual spring biasing arrangement is employed to assure that the resilient idler wheel exerts a sufficient force upon the card and that the resilient idler wheel exerts sufficient force upon the drive shaft to insure that the drive shaft rotates in correspondence with the movement of the card, irrespective of the thickness of the card.

Pursuant to the invention, a carriage is mounted on the molding forming the card slot for pivotal movement about an axis parallel to the width dimension of the slot. The carriage is spring biased such that the forward portion of said carriage is continuously urged toward the slot. The carriage carries a rotatable idler wheel support which rotatably supports the idler wheel at one end thereof. The idler wheel support is spring biased to continuously urge the idler wheel against the drive shaft. The drive shaft preferably has a substantially smaller diameter than the idler wheel. The drive shaft has fixedly attached thereto a light beam interrupter disc which, together with an associated light beam and photocell, generates a train of clock pulses at a rate corresponding to the rate of rotation of the shaft and idler wheel. The molding is broken away to the slot, preferably opposite the recording head, to provide access for the idler wheel to the card. The spring biasing of the carriage causes the idler wheel to exert sufficient force against the card to insure that the idler wheel rotates in correspondence with the movement of the card, and the spring biasing of the idler wheel support causes the idler wheel to exert sufficient force against the drive shaft to insure that the drive shaft rotates proportionately to the rotation of the idler wheel. Preferably, the spring force biasing the idler wheel support is substantially stronger than the spring force biasing the carriage.

DESCRIPTION OF THE DRAWINGS

In the drawings:

FIG. 4 is a top view of FIG. 2;

FIG. 5 is a sectional view, with a portion broken away, taken along the lines 5—5 of FIG. 4; and FIG. 6 is a sectional view taken along the lines 6—6 of FIG. 4.

DETAILED DESCRIPTION

Figure 1:
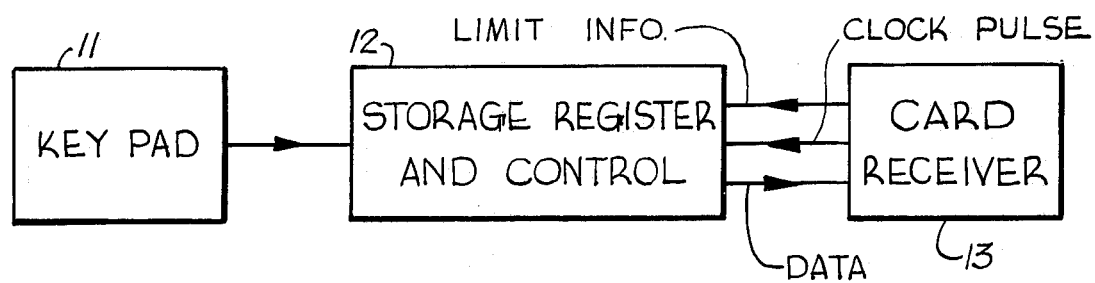
FIG. 1 is a schematic functional diagram of a self-clocking encoding system incorporating the present invention.

Referring to the functional diagram of FIG. 1, wherein the arrows denote the flow of information, an operator enters the information desired to be encoded on a standard manual hexadecimal keypad 11. This information is stored in a standard storage register and control 12 (hereinafter referred to simply as "storage register") which may be identical to the corresponding equipment of FIG. 13 of Darjany U.S. Pat. No.

3,946,206. The information card to be encoded is inserted into a card receiver 13 which will be described in detail in connection with FIGS. 2–6. The card receiver includes means for generating a signal (the "limit information" signal of FIG. 1) defining a particular position of the card in the receiver. Movement of the card generates a train of clock pulses having a repetition rate corresponding to the velocity of the card. Receipt of the limit information (data release) signal permits the release of the binary data from the storage register and its application to the recording head in synchronism with the clock pulses. It will be understood that FIG. 1 is strictly a functional representation. All apparatus represented by FIG. 1 may be, and preferably is, contained in a single chassis.

Referring now to FIGS. 2–6 for a detailed description of the apparatus performing the "card receiver" functions of FIG. 1, there is shown a molding 14 formed from two joined complementary upper and lower pieces. Molding 14 forms a card receiving slot 15 and supports recording head 16 in a position to operably contact the lower surface of the card 10 (shown in dotted outline in FIG. 6) as it is inserted and removed from the slot. Recording head 16 is a standard recording head, for example, a Nortronics Model No. B2H8R-N. The recording head is shown offset to the left of center somewhat solely for the reason that, in applicants' particular application, the magnetic stripe is toward the left side of the card. The slot has dimensions only slightly greater in width and thickness than the card itself. Thus very little play of the card is possible laterally or up and down when it is inserted into the slot. A rectangular recessed central section 17 is provided in molding 14 to facilitate insertion of the finger held card to its innermost position in the slot. Outward of central section 17, inclined planes 18 connect the slot 15 with the larger front opening to form a kind of funnel to facilitate manual insertion of the card.

Slot 15 extends rearwardly far enough to accommodate substantially the entire length of the card except for a finger held portion. Positioned at the rear of the slot is a microswitch 19 having a button 21 positioned to be actuated by the leading edge of the card when the card is in its innermost position. (See FIG. 6) The data release or "limit information" signal thus appears on output leads 22 of switch 19.

A framework or carriage 23 carries most of the remaining elements of the card receiver 13. Carriage 23 is pivotally mounted on molding 14 for rotation about axis 24 (See FIG. 5). A tension spring 25 has one end attached to molding 14 at point 26 and has its other end attached to carriage 23 at point 27 so as to continuously spring bias the carriage in a counter-clockwise direction as indicated by the arrow 28 in FIG. 5. From the viewpoint of FIG. 6, spring 25 urges carriage 23 to rotate clockwise until it assumes the position shown, with the idler wheel 29, to be described hereinafter, bearing against the magnetic gap end of recording head 16.

It will be noted that with the pivot axis 24 of carriage 23 positioned, as is preferable, relatively close to slot 15 and relatively well to the rear of recording head 16, the slight upward movement of idler wheel 29 enforced by insertion of the card is, as is desirable, in an essentially vertical direction in FIGS. 5 and 6.

Figure 2:
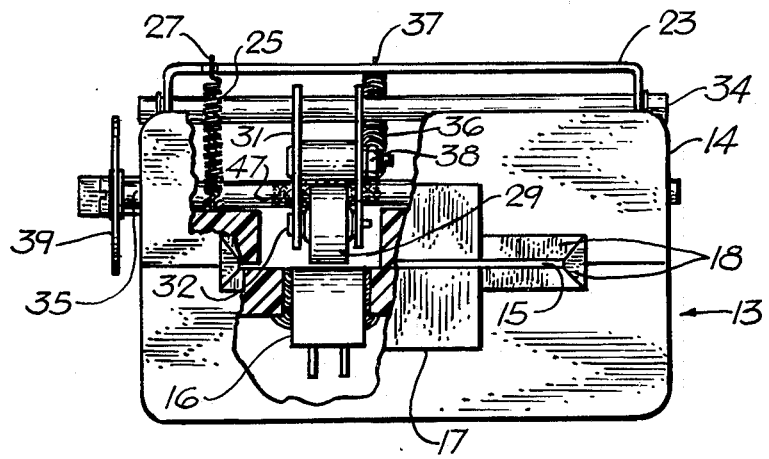
FIG. 2 is a front elevation view, with portions broken away, of apparatus according to the invention which performs the "card receiver" functions of FIG. 1.
Figure 3:
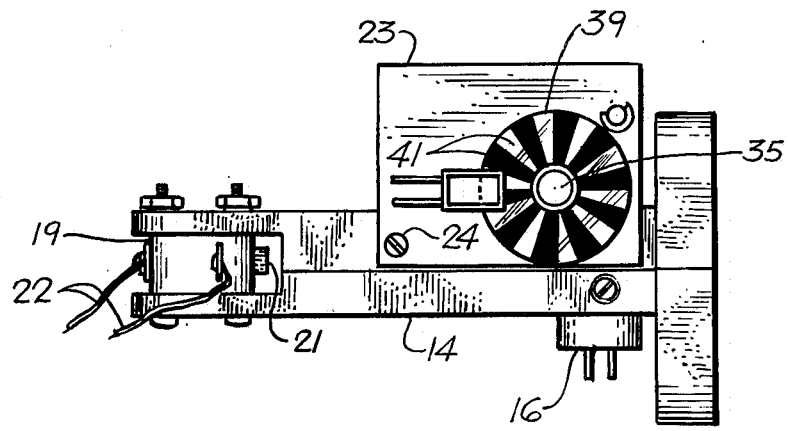
FIG. 3 is a left end view of FIG. 2.

The previously mentioned idler wheel 29 is formed of a resilient material, such as rubber or soft plastic, and is mounted on idler wheel support 31 for rotation about its own axis 32 at the lower end of support 31. (See FIG. 6) Idler wheel support 31 is, itself, rotatably mounted on carriage 23 for rotation about a pivot axis 34. A drive shaft 35 is also mounted on carriage 23 for rotation about its own axis, ball bearings being employed in this mounting in order to reduce friction to a minimum. As shown in FIG. 2, drive shaft 35 preferably has a knurled or roughened surface portion 47 where it engages idler wheel 29. As shown, the axis of drive shaft 35 is parallel to that of idler wheel 29 and is somewhat to the rear and somewhat above the axis of idler wheel 29. A spring 36 has one end connected to the carriage 23 at point 37 and its other end connected to the idler wheel support 31 at an intermediate point 38. Thus, idler wheel support 31 is spring loaded by spring 36 in a clockwise direction (in FIG. 6) to the fixed position shown, with idler wheel 29 bearing against shaft 35. It will be noted that with pivot axis 34 of idler wheel support 31 and axis 32 of idler wheel 29 substantially vertically aligned, as illustrated and as preferred, the upward force exerted on idler wheel 29 by the leading edge of an entering card will have no component of force in a direction tending to rotate the idler wheel support in a counter-clockwise direction away from its fixed position bearing against drive shaft 35. Thus, the upward force exerted upon idler wheel 29 will have no tendency to reduce the pressure between idler wheel 29 and drive shaft 35, but will instead, rotate the entire carriage 23 slightly counter-clockwise (in FIG. 6) about axis 24 and against the force of spring 25.

Preferably, the spring 36 has a substantially greater spring force than spring 25 such that even if the mechanical design were such that the upward force applied against idler wheel 29 by an entering card did have a component in a direction such as to tend to oppose the action of spring 36, the force would still be relieved by rotation of the entire carriage counter-clockwise in FIG. 6, the frictional engagement between idler wheel 29 and drive shaft 35 remaining of the same force.

As best seen in FIG. 4, drive shaft 35 extends through one of its ball bearing journals to the outside of carriage 23. At this end of shaft 35, there is fixedly mounted a disc 39 which rotates with shaft 35. Disc 39 has alternate opaque and transparent sectors 41 (FIG. 3) and the disc is positioned relatively to a light beam 42 such that the beam is interrupted on its way to light sensitive element 45 by the opaque sectors as the disc 39 revolves. The light beam may be produced by applying power via leads 43 to a light emitting diode 44 and the light beam sensitive element 45 may be a silicon photo-darlington which produces, across its output leads 46, a train of clock pulses at a rate corresponding to the rate of rotation of the disc 39. The combination of light emitting diode and light sensitive element is available commercially as the Monsanto Optical Limit Switch Model MCA8 or MCA81.

In operation, it will be apparent that as a card is inserted and its leading edge reaches the idler wheel 29, the carriage 23 will be forced to rotate counter-clockwise (In FIG. 6) against the force of spring 25, thus causing the idler wheel 29 to apply a continuous pressure against the card and through the card to the gap end of the recording head 16. This pressure is sufficient to cause the idler wheel 29 to rotate in correspondence with the movement of the card. The continuous pressure exerted between idler wheel 29 and drive shaft 35 by virtue of spring 36 is sufficient to cause drive shaft 35 to be driven by idler wheel 29 without loss of any rotational movement. Since the drive shaft 29 directly drives interrupter disc 39, it will be apparent that the output signal on lead 46 constitutes a train of clock pulses having a repetition rate corresponding to the velocity of card movement and suitable for transmission to the storage register to regulate the serial release of the binary data stored therein.

In one specific application of the invention, disc 39 is one inch in diameter and it is divided into 9 transparent and 9 opaque sectors so that the sector-to-sector distance along the circumference is $(1 \times 3.1416/18) = 0.1745$ inch. The diameter of the idler wheel 19 is 0.500 inch and the diameter of the drive shaft 35 is 0.172 inch, resulting in a drive ratio between the two of $0.500/0.172 = 2.907$. The resulting relationship between disc 39 rotation and card travel is therefore $(0.500/0.172 \times 0.500 \times 3.1416) = 1.851$ revolutions/inch. In this specific application, the control circuitry associated with the storage register is such that one bit is released at each transition of the clock pulse train, that is, one bit is released for each half wave length of the clock pulse train. Since one complete revolution of the disc 39 corresponds to 18 half wave lengths of the clock pulse train, and the consequent release of 18 data bits, there are recorded $18 \times 1.851 = 33.3$ bits per inch on the card, which bit density is very satisfactory for the intended purpose. An important advantage of the invention is that the disc 39 is readily replaceable so that if a higher or lower bit density is desired, a disc having a greater or lesser number of sectors, respectively, may be used.

If the disc 39 were driven directly by the 0.500 inch diameter idler wheel 19, that is, if the device did not incorporate the 2.907 idler wheel/drive axle drive ratio, the disc would have to have about 2.907 as many sectors in order to obtain the desired bit density of about 33.3 bits per inch. The sector-to-sector distance along the circumference of the one inch diameter disc would then be $0.1745/2.907 = 0.06$ inch, which is too small to obtain satisfactory resolution. In order to bring the sector-to-sector distance along the circumference back up to 0.1745 inch, and thereby restore the resolution, the diameter of disc 39 would have to be enlarged by the factor of 2.907, which would call for a 2.907 inch diameter disc 39. Such a large disc would be undesirable in the compact equipment of the present invention. This undesirable result is avoided by the introduction, in accordance with the present invention, of a drive ratio of about three between the idler wheel 29 and the drive shaft 35 and disc 39.

For best results, the card should be inserted and removed in a relatively smooth and continuous motion, and, in the particular application disclosed above, at a uniform speed of approximately 10 inches per second. In a refined application of the present invention, the clock pulses may be computer monitored as the card is being inserted and as it is being withdrawn to check on the appropriateness of the speed and smoothness of card insertion and withdrawal and also to insure that the card is not left in the erase position too long. In the latter event, an automatic shut-off may be used to protect the equipment from damage.

As described above, the data release signal is given by switch 19 when the card reaches its innermost position in slot 15, and the data recording operation takes place during the subsequent card withdrawal. It is within the scope of the invention to position the switch 19 so that it is actuated by the leading edge of the card when the card initially enters the mouth of the slot 15. Further, it will be understood that, if desired, the data recording operation could take place during card insertion rather than card withdrawal. It would also be possible, if desired, to utilize the initiation of the clock pulse (when the leading edge of the card first engages idler wheel 29) to signal a particular position of the card instead of employing switch 29 for such purpose.

In the above description, terms such as front, upper, rearward, and the like, were used primarily to facilitate the description and clarify the relationship of parts, rather than being used in an absolute sense. In particular, it should be understood that FIG. 2 could well be a top view rather than a front view such that the information card would be inserted downwardly from the top rather than inwardly from the front.

It will be apparent that, in accordance with the principles of the present invention, there is provided a self-clocking magnetic information card encoder which is simple, inexpensive, and compact, which can be readily adapted to different desired bit densities, which accepts cards of varying thicknesses, which provides a high degree of accuracy and resolution relative to its dimensions, which can be manually operated, and which requires neither a constant speed drive nor a constant frequency generator.

We claim:

1. In a magnetic information card encoding apparatus wherein binary data to be encoded on a magnetizable card is stored in a storage register for release in synchronism with a train of clock pulses, in combination, structural means forming a slot adapted to receive the card as it is manually inserted lengthwise into said slot, said slot having a width and thickness generally conforming to the width and thickness, respectively, of the card, said slot having a length such as to accommodate all of said card except for a finger held portion at the end of the card, a magnetic recording head for receiving the binary data to be recorded, said recording head being fixedly mounted on said structural means in a position such that the magnetic gap end of said recording head is adapted to operatively contact the card at the point along the width of the card at which the encoded magnetic track is desired, means forming an idler wheel card access opening extending through said structural means to said slot, a carriage pivotally mounted on said structural means for rotation about an axis parallel to the width dimension of said slot at a point to the rear of said recording head, an idler wheel support pivotally mounted on said carriage for rotation about an axis parallel to the pivot axis of said carriage, an idler wheel formed of resilient material rotatably mounted on one end of said idler wheel support for rotation about an axis also parallel to the pivot axis of said carriage, a drive shaft rotatably mounted on said carriage and having an axis parallel to the axis of said idler wheel, the diameter of said idler wheel being substantially greater than that of said drive shaft at their point of engagement, a first spring means interconnecting said idler wheel support and said carriage to urge said idler wheel against said drive shaft to establish a friction drive therebetween and to define a fixed position of said idler wheel support relative to said carriage, a second spring means interconnecting said structural means and said carriage to urge the forward idler wheel carrying portion of said carriage to rotate about the carriage pivot axis toward the slot of said structural means, the pivot axis of said idler wheel support and the axis of said drive shaft being positioned on the carriage such that in such fixed position of the idler wheel support, the idler wheel extends through said access opening to frictionally engage the surface of the card under the urging of said second spring means, and means driven by said drive shaft for generating a train of clock pulses at a rate corresponding to the rate of rotation of said drive shaft, and to the velocity of the card, for transmission to the storage register.

2. In a magnetic information card encoding apparatus wherein binary data, which is to be encoded at a constant spatial density on a magnetic stripe running lengthwise of the information card, is stored in a storage register for release in synchronism with a train of clock pulses received by the storage register, in combination, structural means forming a guide for said card as it is manually transported lengthwise along said guide, a magnetic recording head for receiving the binary data to be recorded, said recording head being fixedly mounted on said structural means in a position such as to operatively traverse the magnetic stripe of the card as the card is moved along the guide, a carriage pivotally mounted on said structural means for rotation about an axis parallel to the width dimension of the card, an idler wheel support pivotally mounted on said carriage for rotation about an axis parallel to the pivot axis of said carriage, an idler wheel rotatably mounted at one end of said idler wheel support for rotation about an axis also parallel to the pivot axis of said carriage, a drive shaft mounted on said carriage for rotation about an axis parallel to the axis of said idler wheel, the diameter of said idler wheel being substantially greater than that of said drive shaft at their point of engagement, a first spring means interconnecting said idler wheel support and said carriage to urge said idler wheel against said drive shaft to establish a friction drive therebetween and to define a fixed position of said idler wheel support relative to said carriage, a second spring means interconnecting said structural means and said carriage to urge said idler wheel against the information card to establish a friction drive therebetween, and means driven by said drive shaft for generating a train of clock pulses at a rate corresponding to the rate of rotation of said drive shaft, and to the velocity of the card, for transmission to the storage register.

3. Apparatus, as claimed in claim 2, wherein said first spring means has a greater spring force than said second spring means.

4. Apparatus, as claimed in claim 2, wherein the fixed position of the idler wheel support is such that the axis of said drive shaft is spaced farther away from the card than the idler wheel axis.

5. Apparatus, as claimed in claim 2, wherein the fixed position of the idler wheel support is such that the plane defined by the axis of the idler wheel and the pivot axis of the idler wheel support is substantially normal to the card.

6. Apparatus, as claimed in claim 2, wherein the fixed position of the idler wheel support is such that the force exerted on the idler wheel by the leading edge of an entering card has no component in a direction tending to oppose the action of said first spring means.

7. Apparatus, as claimed in claim 2, wherein the surface of said drive shaft is knurled or roughened in the region of its contact with the idler wheel.

8. Apparatus, as claimed in claim 2, wherein said last named means comprises a photoelectric cell, a light beam focussed upon said cell, and an interrupter disc driven by said drive shaft and interposed in the path of said light beam, said disc having equal alternate opaque and transparent sectors.

9. Apparatus, as claimed in claim 2, further including switch means adapted to be actuated by the leading edge of said card for generating a data release signal for transmission to the storage register.

10. Apparatus, as claimed in claim 2, wherein the pivot axis of said carriage is proximate to the card.

11. Apparatus, as claimed in claim 2, wherein said recording head and said idler wheel access opening are on opposite sides of the card.

12. Apparatus, as claimed in claim 11, wherein said recording head and said idler wheel are aligned so that, with no card present, the idler wheel engages the gap end of said recording head under the urging of said second spring means.

13. Apparatus, as claimed in claim 12, wherein said first spring means has a greater spring force than said second spring means, and wherein the fixed position of the idler wheel support is such that the axis of said drive shaft is spaced further from the card than the idler wheel axis and the plane defined by the axis of the idler wheel and the pivot axis of the idler wheel support is substantially normal to the card.

* * * * *